(12) United States Patent
Fries et al.

(10) Patent No.: US 10,946,883 B2
(45) Date of Patent: Mar. 16, 2021

(54) TRAIN DETECTION SYSTEM FOR A RAILWAY TRACK, A METHOD FOR DETECTING A TRAIN ON A RAILWAY TRACK, AND A CONTROLLER FOR A TRAIN DETECTION SYSTEM FOR DETECTING A TRAIN ON A RAILWAY TRACK

(71) Applicant: ALSTOM TRANSPORT TECHNOLOGIES, Saint-Ouen (FR)

(72) Inventors: Jeffrey Fries, Grain Valley, MO (US); Jared Cooper, Melbourne, FL (US); Phillip Martin, Melbourne, FL (US); Seneca Snyder, Melbourne, FL (US); Nicholas Nagrodsky, Melbourne, FL (US)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 278 days.

(21) Appl. No.: 16/059,423

(22) Filed: Aug. 9, 2018

(65) Prior Publication Data
US 2020/0047785 A1 Feb. 13, 2020

(51) Int. Cl.
*B61L 29/30* (2006.01)
*B61L 23/00* (2006.01)
(Continued)

(52) U.S. Cl.
CPC ............ *B61L 29/30* (2013.01); *B61L 23/007* (2013.01); *B61L 23/041* (2013.01); *B61L 23/34* (2013.01);
(Continued)

(58) Field of Classification Search
CPC ........ B61L 13/00; B61L 13/005; B61L 23/00; B61L 23/007; B61L 29/00; B61L 29/08; B61L 29/18; B61L 29/30
See application file for complete search history.

(56) References Cited

U.S. PATENT DOCUMENTS

| 2008/0169939 A1* | 7/2008 | Dickens .................. G08G 1/02 340/910 |
| 2010/0026562 A1 | 2/2010 | Hyodo et al. |

(Continued)

FOREIGN PATENT DOCUMENTS

| DE | 10341426 A1 | 4/2005 |
| EP | 0100243 A2 | 2/1984 |

(Continued)

OTHER PUBLICATIONS

European Search Report issued in corresponding EP 19 19 0992 dated Dec. 4, 2019.
(Continued)

*Primary Examiner* — Robert J McCarry, Jr.
(74) *Attorney, Agent, or Firm* — Troutman Pepper Hamilton Sanders LLP (57) ABSTRACT

A train detection system for a railway track defines a first lateral side and a second lateral side opposite the first lateral side. Two cameras are arranged along the railway track spaced apart from each other. Each camera is placed on either the first lateral side or the second lateral side. The system includes at least one passive target. Each of the passive targets is placed within the field of view of at least one of the cameras and on the opposite lateral side of the railway track with respect to the at least one of the cameras in whose field of view the respective passive target is placed. The system also includes at least one controller adapted to recognise the passive target in the images provided by at least one of the cameras to the controller to determine whether a train is located on the railway track.

17 Claims, 3 Drawing Sheets

(51) Int. Cl.
*B61L 23/04* (2006.01)
*B61L 23/34* (2006.01)
*B61L 29/22* (2006.01)
*G06K 9/00* (2006.01)
*G06T 7/00* (2017.01)
*G08G 7/02* (2006.01)

(52) U.S. Cl.
CPC .......... *B61L 29/22* (2013.01); *G06K 9/00758* (2013.01); *G06T 7/0008* (2013.01); *G06T 2207/30236* (2013.01); *G08G 7/02* (2013.01)

(56) References Cited

U.S. PATENT DOCUMENTS

| | | | |
|---|---|---|---|
| 2012/0269383 A1 | 10/2012 | Bobbitt et al. | |
| 2013/0194423 A1* | 8/2013 | Baines | B61L 29/30 348/148 |
| 2014/0333771 A1* | 11/2014 | Mian | B61L 23/041 348/149 |
| 2014/0339374 A1* | 11/2014 | Mian | G08G 1/04 246/473.1 |
| 2016/0189552 A1 | 6/2016 | Hilleary | |
| 2016/0200334 A1* | 7/2016 | Hilleary | G08G 1/097 246/218 |
| 2017/0274917 A1* | 9/2017 | Worthey, Sr. | B61L 29/30 |

FOREIGN PATENT DOCUMENTS

| | | |
|---|---|---|
| FR | 2943607 A3 | 3/2009 |
| WO | 2010058703 A1 | 5/2010 |

OTHER PUBLICATIONS

Oh, S. et al., "Development of a Vision based Railway Platform Safeguard" 9th World Congress on Railway Research, pp. 1-10 (May 2011).

* cited by examiner

TRAIN DETECTION SYSTEM FOR A RAILWAY TRACK, A METHOD FOR DETECTING A TRAIN ON A RAILWAY TRACK, AND A CONTROLLER FOR A TRAIN DETECTION SYSTEM FOR DETECTING A TRAIN ON A RAILWAY TRACK

FIELD OF TECHNOLOGY

The present disclosure relates to a train detection system for a railway track.

Further, the present disclosure concerns a method for detecting a train on a railway track.

According to another aspect, the present disclosure concerns a controller in a train detection system for detecting a train on a railway track.

BACKGROUND

At a railway level crossing of a road, wireless train detection systems are used to detect whether a train is present in the proximity of the level crossing and to activate safety measures to ensure the safety of road vehicles by preventing them from approaching the level crossing where the train is present.

Typically, track circuits are required to detect whether a train is located in the proximity of the level crossing. This requires wires to be buried under the rail bed and the road bed, or wheel sensors to be attached to the rails, which is expensive to implement. Another drawback of such systems is that they require regular maintenance and are routinely damaged by track maintenance equipment.

SUMMARY

According to an aspect, a train detection system is provided for a railway track, the railway track defining a first lateral side and a second lateral side opposite the first lateral side, said train detection system comprising:
  at least two cameras, said cameras being arranged along the railway track spaced apart from each other, each camera being placed on either the first lateral side or the second lateral side;
  at least one passive target, each of said passive targets being placed within the field of view of at least one of the cameras and on the opposite lateral side of the railway track with respect to the at least one of the cameras in whose field of view the respective passive target is placed; and
  at least one controller adapted to recognise the at least one passive target in the images provided by at least one of the cameras to the controller in order to determine whether a train is located on the railway track.

Embodiments may include one or more of the following features in any technical feasible combination:
  the train detection system further comprises at least one light, each light being advantageously arranged on the same lateral side as at least one of cameras, said light being directed towards at least one of the cameras and/or the at least one passive target and adapted to emit light with varying intensity.
  the controller is adapted to detect light intensity variations over the time from the at least one light in order to determine that the cameras capture live images.
  the train detection system comprises at least two passive targets spaced apart from each other.
  the train detection system is adapted to be installed at a level crossing, wherein a first camera of the at least two cameras and a first passive target is arranged on a first side of a road or path intersecting the railway track, and a second camera of the at least two cameras and a second passive target is arranged on a second side of the road or of the path.
  each passive target possesses at least one individual property recognisable by the cameras and/or by at least one controller treating the images captured by the cameras.
  the at least one individual property is the size visible to the cameras, the shape visible to the cameras, a pattern or a colour visible to the cameras, or a combination thereof.
  the cameras have a field of view covering at least one passive target and at least one light.
  the train detection system comprises at least two lights wherein each light emits a unique signal different to that from each other light, said signal allowing each light to be distinguished from other lights.
  the frequency of light intensity variations over the time is different between different lights, and/or the patterns of each light.
  the at least two cameras are placed on the first lateral side of the railway track, wherein the train detection system comprises at least two lights arranged spaced apart from each other on the first lateral side.
  the light intensity variations of the light(s) over the time are known to the controller so that the controller is able to distinguish natural light variations from the light intensity variations caused by the lights.

According to another aspect, a method for detecting a train on a railway track is provided, the railway track defining a first lateral side and a second lateral side opposite the first lateral side, said method comprising:
  receiving image data from at least two cameras, said cameras being arranged along the railway track spaced apart from each other, each camera being placed on either the first lateral side or the second lateral side, said cameras being arranged such that at least one passive target, placed respectively on the opposite lateral side of the railway track with respect to at least one of the cameras, is within the field of view of the at least one of the cameras; and
  determining whether the received image data include image information about the at least one passive target, and, in case the image does not contain image data of the at least one passive target, determining that a train is located on the railway track.

Embodiments may include one or more of the following features in any technical feasible combination:
  the method further comprises a light, advantageously arranged on the same lateral side as at least one of cameras, emitting a first light directed towards the at least one of the cameras and/or the at least one passive target with varying intensity over time; detecting by the at least one of the cameras the light intensity variations over the time in order to determine that the at least one of the cameras captures live images.
  the method further comprises determining whether the received image data include image information about at least two passive targets spaced apart from each other, each passive target possessing at least one individual property recognisable by the cameras or by a controller treating the images captured by the cameras, a first camera of the at least two cameras and a first passive target being arranged on a first side of a road intersecting the railway track, and a second camera of the at least two cameras and a second passive target being arranged on a second side of the road.

the method further comprises emitting a second light illuminating at least one passive target with varying intensity over time from the second lateral side of the track, wherein each light emitting a unique signal different to that from each other light.

According to a further aspect, a controller in a train detection system for detecting a train on a railway track is provided, the railway track defining a first lateral side and a second lateral side opposite the first lateral side, the controller being adapted:

to receive image data from at least two cameras, said cameras being arranged along the railway track spaced apart from each other, each camera being placed on either the first lateral side or the second lateral side, said cameras being arranged such that at least one passive target, placed respectively on the opposite lateral side of the railway track with respect to at least one of the cameras, is within the field of view of the at least one of the cameras; and to determine whether the received image data include image information about the at least one passive target, and, in case the image does not contain image data of the at least one passive target, to determine that a train is located on the railway track.

Embodiments may include one or more of the following features in any technical feasible combination:

the at least one passive target is illuminated by at least one light, advantageously arranged on the same lateral side as the at least one of the cameras, emitting a first light directed towards the at least one of the cameras and/or the at least one passive target with varying intensity over time, the controller being adapted to detect light intensity variations over the time in order to determine that one of the cameras capture live images.

the controller is adapted to determine whether the received image data include image information about at least two passive targets as to determine whether a train is located on the railway track, said passive targets being arranged such that said at least two passive targets are spaced apart from each other, each passive target possesses at least one individual property recognisable to the cameras, a first camera of the at least two cameras and a first passive target is arranged on a first side of a road intersecting the railway track, and a second camera of the at least two cameras and a second passive target is arranged on a second side of the road.

the controller is adapted to distinguish each light from other lights by a unique signal emitted by each light which is different to that of each other lights.

BRIEF DESCRIPTION OF THE DRAWINGS

The aforementioned advantages and features of the present disclosure will be better understood with reference to the following detailed description and the accompanying drawings in which.

DETAILED DESCRIPTION

Figure 1:
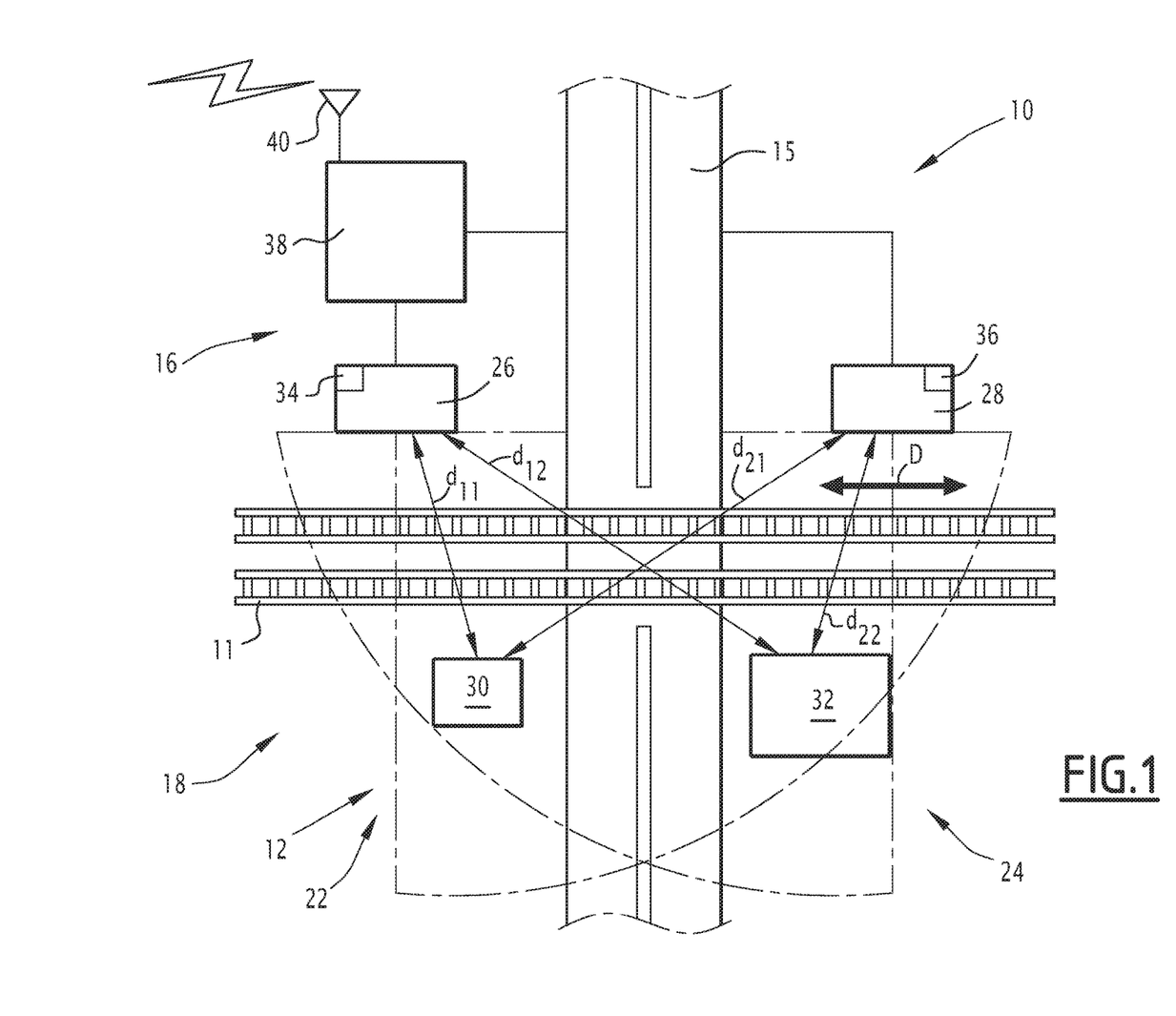
FIG. 1 illustrates an embodiment of a train detection system.

FIG. 1 illustrates an embodiment of a train detection system 10 for at least one railway track 11. In case of a plurality of railway tracks 11, they may be arranged substantially parallel. The at least one railway track 11 defines a driving direction D of a train. The railway track 11 defines a first lateral side 16 of the railway track 11 and a second lateral side 18 of the railway track 11 opposite the first lateral side 16.

At the railway track 11, in some embodiments, a railway level crossing 12 is provided. A road 15 crosses the rail way track 11 at the level crossing 12. In another embodiment, instead of or in addition to a road, a path may be provided that crosses the railway track 11.

The road 15 may intersect the railway track 11 at different angles. In the embodiment shown in FIG. 1, the road 15 intersects the railway track 11 at about 90°. The road 15 defines a first side 22 of the road 15 and a second side 24 of the road 15 opposite the first side 22.

In an embodiment, the train detection system 10 comprises at least two cameras 26, 28, at least two passive targets 30, 32, at least two strobe lights 34, 36, and a controller 38. However in other embodiments, only a single passive target 30 is used.

The cameras 26, 28 are arranged on the first lateral side 16 of the railway track 11. They are arranged spaced apart from each other in the driving direction D of the train. As shown in the FIG. 1, in an embodiment a first camera 26 is located on the first side 22 of the road 15 and a second camera 28 is located on the second side 24 of the road 15. The cameras are spaced apart at least 5 m. The cameras 26, 28 are sensitive at least to the lights of the strobe lights 34, 36 and/or to visible light.

In another embodiment, the cameras 26, 28 may be arranged on opposing lateral sides 16, 18 of the railway track 11 and potentially on the same side of the road 15, for example on the first side 22 of the road, or on different sides of the road.

The field of view of the cameras 26, 28 is adapted to include the at least one passive target, in particular the at least two passive targets 30, 32 of the train detection system 10.

In the embodiment shown in FIG. 1, the cameras 26, 28 have respectively a field of view greater than 85°, preferably greater than 95°. The field of view allows each camera 26, 28 to see at least one strobe light 34, 36, in particular provided at the respective other camera 26, 28, the respective other camera 26, 28 and/or the at least one passive target 30, 32, in particular all passive targets 30, 32. For example, the field of view may include at least one strobe light 34, 36 and the at least one, in particular two, passive targets 30, 32. Thus, the first and the second sides 22, 24 of the road 15 on the second lateral side 18 of the railway track 11, which enables the cameras 26, 28 to see the railway level crossing 12 within the field of view.

In an embodiment, the field of view of each camera 26, 28 extends approximately between a direction parallel to the at least one railway track 11 and a direction perpendicular to the railway track 11, in particular when respectively one passive target is arranged approximately opposite on the other side of the railway track 11 to the cameras 26, 28.

In a variant, each camera 26, 28 is capable of determining, in particular measuring, the distance between the respective camera 26, 28 and the objects within its field of view, for example the passive targets 30, 32.

The controller 38 connected to the or each camera 26, 28 is adapted to perform an image processing, for example an image recognition. The connection of the controller 38 to the camera(s) 26, 28 is carried out through a wire, or in a wireless manner. Further, the cameras 26, 28 and/or the controller 38 are adapted to store a plurality of subsequent captured frames of the cameras 26, 28. In other embodiments, the cameras 26, 28 perform the image processing, in particular the image recognition.

The at least one passive target 30, 32 is installed on the second lateral side 18 of the railway track 11. In the case of a plurality of passive targets 30, 32, they are spaced apart from each other in the driving direction D of a train moving on one of the railway tracks 11. As shown in the FIG. 1, in an embodiment, a first passive target 30 is located on the first side 22 of the road 15, and a second passive target 30 is located on the second side 24 of the road 15.

In another embodiment, when two cameras 26, 28 are arranged on the same side of the road 15, for example on the first side 22 of the road, the two passive targets 30, 32 are provided on the second side 24 of the road on both lateral sides 16, 18 of the railway track 11. Passive targets 30, 32 and the corresponding cameras 26, 28 are arranged on opposite lateral side of the railway track 11.

Each passive target 30, 32 is placed within the field of view of each camera 26, 28. In an embodiment, a first passive target 30 is located opposite to the first camera 26, and a second passive target 32 is located opposite to the second camera 28.

Each passive target 30, 32 does not require an electric power supply and is fixed at a specific position.

Each passive target 30, 32 possesses at least one individual property recognisable by the cameras 26, 28 and/or the controller 38 during operation in order to identify a particular passive target 30, 32 by an image recognition logarithm.

Said individual property is for example the size, the shape, the colour of each passive target 30, 32.

The passive target 30, 32 is for example sign or board. The passive targets 30, 32 may be objects present within the field of view of the cameras 26, 28 (for example, rails, ties, ballast, structures, etc), i.e. in the environment of the cameras and notably in the area around the level crossing area. Each passive target 30, 32 is, for example, chosen among rails of the railway track, railway ties of the railway track, a ballast receiving the railway track, a train powering system installed along the railway track, an electrical bungalow installed along the railroad track.

The strobe lights 34, 36 are placed on the first lateral side 16 of the railway track 11. In a preferred embodiment of the invention, each strobe light 34, 36 is preferably mounted adjacent to a respective camera, for example directly above or below a respective camera 26, 28. In other words, a first strobe light 34 is located, in a top view, at the same location as the first camera 26, and a second strobe light 36 is located, in a top view, at the same location as the second camera 28.

Each strobe light 34, 36 is adapted to illuminate at least one passive target 30, 32 and/or to direct the light to the camera 26, 28 adjacent to which the strobe light 34, 36 is not mounted or connected. In an embodiment of the invention, each strobe light 34, 36 is adapted to illuminate both passive targets 30, 32.

Each strobe light 34, 36 is adapted to emit a unique signal different from that from other strobe lights 34, 36. Said unique signal allows each strobe light 34, 36 to be distinguished from other strobe lights 34, 36. In other words, the unique signal enables to identify a strobe light or to code unique information. This unique signal is a dynamic signal.

Said unique signal is for example the light intensity variation over the time on the passive targets 30, 32. In an embodiment, each strobe light 34, 36 has a distinct flashing frequency or rate. In an embodiment, which may be combined with other embodiments, the unique signal is a pattern or code of the strobe light 34, 36. The frequency of the light intensity variations over the time is dependent on the frame rate of the cameras 26, 28. In an embodiment the frame rate of the cameras 26, 28 is at least twice of the frequency of the light intensity variations of the strobe lights 34, 36.

In some embodiments, instead of strobe lights other lights or light sources adapted to generate a light with varying intensity and/or pattern is used.

The strobe lights are associated to the cameras 26, 28 as they require a power supply.

In other embodiments only a single strobe light 34 is used, and arranged, on the first lateral side 16 of the railway track 11, such that it is within the field of view of all cameras 26, 28. Said strobe light 34 is adapted to illuminate simultaneously all passive targets 30, 32.

In other embodiments, the strobe lights 34, 36 are omitted.

The controller 38 is adapted to recognise the at least one passive target 30, 32 in the images provided by the cameras 26, 28 to the controller 38 in order to determine whether a train is located on the railway track 11. The controller 38 for example includes at least one processor adapted to process the images captured by the cameras 26, 28.

According to an embodiment, the controller 38 may include at least two independent processors, each adapted to receive and process images from a respective camera. For example each processor can independently decide whether the images received from their respective camera include a live image based on detected light intensity variations. Moreover, each processor can independently decide whether the passive targets 30, 32 are visible or not. In other words, the data from each camera can be processed independently and compared for safety reasons. For example, if one of the processors determines that the passive targets 30, 32 is not visible, the system can determine that a train is occupying the railway track 11.

To determine whether trains are currently on the railway track 11, the controller 38 is adapted to receive the images captured by the cameras 26, 28 and in particular to determine whether the cameras 26, 28 capture live images according to the light intensity variations over the time and/or the pattern of each strobe light 34, 36, for example directly or on the passive targets 30, 32. In other embodiments, the cameras 26, 28 themselves determine whether themselves capture live images according to the light intensity variations over the time and/or the pattern of each strobe light 34, 36 and transmit the result to the controller 38. For that purpose the required light intensity variations are stored in at least one memory of the controller 38 in order to compare the detected light intensity variations with the stored light intensity variations.

The controller 38 is also adapted to activate a safety module (not shown in the Figures) at the railway level crossing 12. In the case where the controller 38 determines that a train occupies the railway level crossing 12, the controller 38 sends a control signal to the safety module. The safety module comprises for example mechanical barriers which can be lowered to prevent road vehicles or pedestrians from approaching the railway level crossing 12 where a train is present. The safety module may further comprise warning lights or loud speakers averting road vehicles approaching the railway level crossing 12.

In an embodiment, the controller 38 is adapted to calculate the direction in which the train travels on the railway track 11 and/or the speed at which the train travels. In another variant, the controller 38 is adapted to detect undesired objects at railway level crossing 12, for example trees fallen on the railway track 11 and/or on the road 15.

In another embodiment, the controller 38 comprises a wireless communication module 40 adapted to communicate with trains travelling on the railway track 11 about for example the information regarding whether an automobile is blocking the railway track 11 at the level crossing 12.

Figure 2:
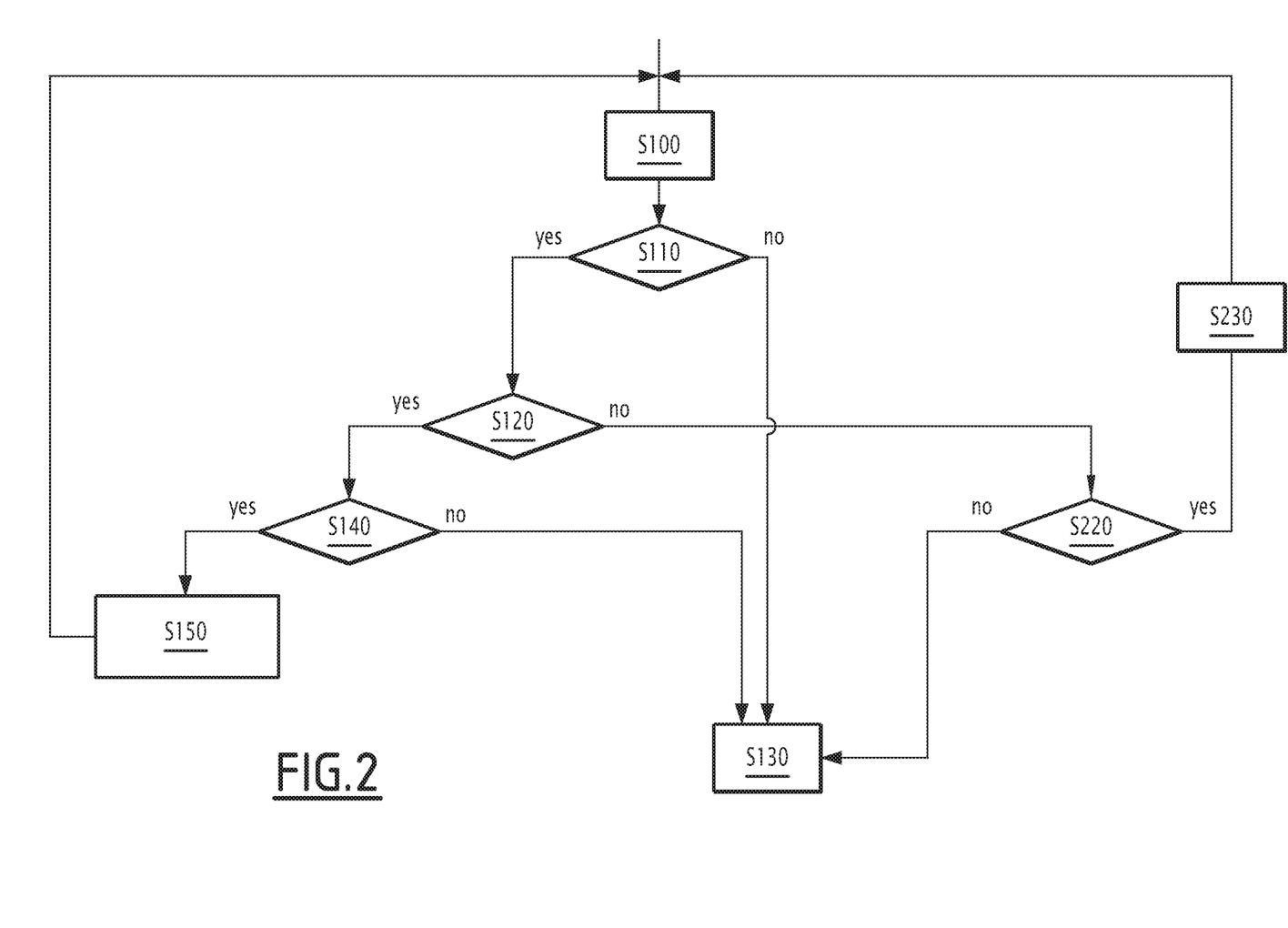
FIG. 2 illustrates a flow chart of a method for detecting a train on a railway track.

An embodiment of method of detecting a train on a railway track 11, in particular using the train detection system 10 will be described with reference to FIG. 2.

As represented by S100, the cameras 26, 28 capture the images of objects within their respective fields of view and then send the images to the controller 38. The strobe lights 34, 36 flash and illuminate the objects within their range of illumination.

Each strobe light 34, 36 adjacent to a camera 26, 28 is directed towards the respective other camera 28, 26 such that the other camera 28, 26 is able to capture directly the light from the strobe lights 34, 36.

The controller 38 receives the image data for example in the form of subsequent captured frames from the cameras 26, 28.

At S110 the controller 38 then checks whether the received image data contains any image information at all. If it does, the process proceeds to S120; if not, the controller 38 transmits a signal indicating that the system is not working and activates the safety measures at the railway crossing 12, represented by S130. S110 may be omitted.

At S120, the controller 38 determines whether the received image data of both cameras 26, 28 or of at least one camera includes image information about all passive targets 30, 32.

If the controller 38 determines that the image data does include information about the passive targets 30, 32, it proceeds to S140 to determine whether the cameras 26, 28 capture the live images of passive targets 30, 32 and/or of the strobe light associated to the respective other camera by detecting light intensity variations over the time and/or the pattern generated by the strobe lights 34, 36. S140 is optional and may be omitted in some embodiments. The light intensity variations of each strobe light 34, 36 or in the case where only one strobe light is used, the light intensity variation of the strobe light, is known by the controller 38, for example stored in a memory, so that the controller 38 is able to distinguish natural variations of light from the light intensity variations caused by the strobe lights 34, 36.

If the controller 38 decides that the image data does contain dynamic signals emitted from the strobe lights 34, 36, it ascertains that the train detection system 10 is working properly, and that there is indeed no train at the railway level crossing 12, as indicated by S150. Then, the process returns to the beginning.

If the controller 38 decides that the image data from at least one camera 26, 28, although containing the image information about the passive targets 30, 32, does not contain the dynamic signal emitted by the strobe lights 34, 36, it determines that the system, in particular the camera did not capture a live image i.e. whether the image is frozen or stale. The controller 38 then transmits a signal indicating that the system is not working, as indicated by S130, In another embodiment which may be combined with embodiments described herein, in S140 each camera 26, 28 is capable of measuring its distance to objects within its field of view, in particular their distances $d_{11}$, $d_{12}$, $d_{21}$, $d_{22}$ to the passive targets 30, 32. The passive targets 30, 32 are placed at known distances from each camera 26, 28. The controller 38 receives the measured distances, and compare them with known distances of passive targets 30, 32 from each camera 26, 28. If the measured distances are within a predetermined range to the known distances, the controller 38 determines that each camera 26, 28 is working properly. If the measured distances deviate significantly from the known distances i.e. is outside the predetermined range, it can be concluded that cameras 26, 28 are not working correctly. Thus the proper functioning of the cameras 26, 28 can be ascertained.

If the controller 38 determines at S120 that the image data does not contain information about all passive targets 30, 32, it proceeds to determine whether a train is present on the railway track 11.

At step S220 the controller 38 determines whether the image contains light intensity variations, for example received directly from the strobe lights 34, 36 associated to the respective other camera 26, 28.

If no light intensity variations or a pattern are/is detected on the images provided by one of the cameras, the controller 38 proceeds to S130 and transmits that the system is not working.

If light intensity variations or a pattern is detected on the images provided by the cameras 26, 28, the controller 38 proceeds to S230 and determines that the images are live images, i.e. light intensity variations have been detected and that there is a train located within the field of view of the cameras 36, 38. The controller 38 may activate safety measures at the railway crossing 12 and/or emit a signal about the presence of the train using the communication module 40.

Optionally, the controller 38 determines whether the train firstly obscures or covers the first passive target 30 and then the second passive target 32 or vice versa in order to determine the travelling direction of the train.

Figure 3:
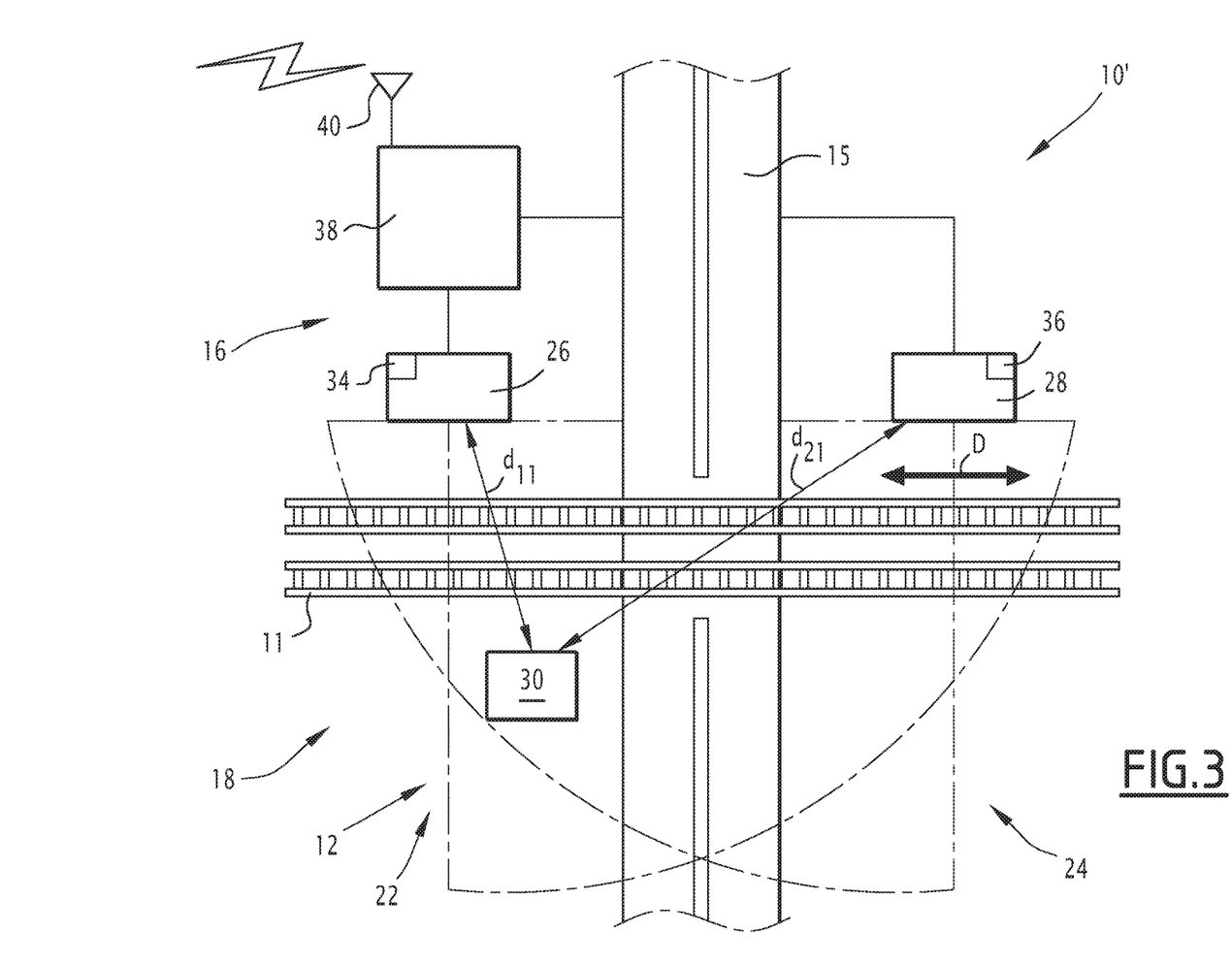
FIG. 3 illustrates another embodiment of a train detection system.

The FIG. 3 illustrates another embodiment of the invention. The same devices are designated with the same reference numbers as the embodiment shown in FIG. 1. This embodiment differs from the embodiment shown in FIG. 1 in that the train detection system 10 comprises solely one passive target 30. The passive target 30 is located on the side of the road 15 or above the road 15. This embodiment reduces the number of passive targets necessary for the train detection system 10, while retaining its effectiveness.

The train detection system and the method for detecting the train on the railway track enables that the cameras 26, 28, the passive targets 30, 32, and strobe lights 34, 36 operate in a wireless manner, which exempts the necessity to bury wires under the railway level crossing 12.

The strobe lights 30, 32 ensure that the controller 38 is able to identify whether the train detection system 10 detects the live state at the railway level crossing 12. This increases the reliability of the train detection system 10.

According to embodiments, the passive targets 30, 32 avoid the necessity of boring or trenching of wires underneath the at least one track 11.

The invention claimed is:

1. A train detection system for a railway track, the railway track defining a first lateral side and a second lateral side opposite the first lateral side, said train detection system comprising:

at least two cameras, said cameras being arranged along the railway track spaced apart from each other, each camera being placed on either the first lateral side or the second lateral side;

at least one passive target, each of said passive targets being placed within the field of view of at least one of the cameras and on the opposite lateral side of the railway track with respect to the at least one of the cameras in whose field of view the respective passive target is placed;

at least one light, said light being directed towards at least one of the cameras and/or the at least one passive target and adapted to emit light with varying intensity; and at least one controller adapted to recognise the at least one passive target in the images provided by at least one of the cameras to the controller in order to determine whether a train is located on the railway track;

wherein the controller is adapted to detect light intensity variations over the time from the at least one light in order to determine that the cameras capture live images.

2. A train detection system as claimed in claim 1, wherein each light is arranged on the same lateral side as at least one of cameras.

3. A train detection system as claimed in claim 2 wherein the cameras have a field of view covering at least one passive target and at least one light.

4. A train detection system as claimed in claim 2, including at least two lights wherein each light emits a unique signal different to that from each other light, said signal allowing each light to be distinguished from other lights.

5. A train detection system as claimed in claim 4, wherein the frequency of light intensity variations over the time is different between different lights, and/or the patterns of each light.

6. A train detection system as claimed in claim 2, wherein the at least two cameras are placed on the first lateral side of the railway track, and wherein the train detection system comprises at least two lights arranged spaced apart from each other on the first lateral side.

7. A train detection system as claimed in claim 2, wherein the light intensity variations of the light(s) over the time are known to the controller so that the controller is able to distinguish natural light variations from the light intensity variations caused by the lights.

8. A train detection system as claimed in claim 1 wherein the train detection system comprises at least two passive targets spaced apart from each other.

9. A train detection system according to claim 1, wherein the train detection system is adapted to be installed at a level crossing, wherein a first camera of the at least two cameras and a first passive target is arranged on a first side of a road or path intersecting the railway track, and a second camera of the at least two cameras and a second passive target is arranged on a second side of the road or of the path.

10. A train detection system as claimed in claim 1, wherein each passive target possesses at least one individual property recognisable by the cameras and/or by at least one controller treating the images captured by the cameras.

11. A train detection system according to claim 10, wherein the at least one individual property is the size visible to the cameras, the shape visible to the cameras, a pattern or a colour visible to the cameras, or a combination thereof.

12. A method for detecting a train on a railway track, the railway track defining a first lateral side and a second lateral side opposite the first lateral side, said method comprising:

receiving image data from at least two cameras, said cameras being arranged along the railway track spaced apart from each other, each camera being placed on either the first lateral side or the second lateral side, said cameras being arranged such that at least one passive target, placed respectively on the opposite lateral side of the railway track with respect to at least one of the cameras, is within the field of view of the at least one of the cameras;

emitting a first light directed towards the at least one of the cameras and/or the at least one passive target with varying intensity over time;

detecting by the at least one of the cameras the light intensity variations over the time in order to determine that the at least one of the cameras captures live images, and determining whether the received image data include image information about the at least one passive target, and, in case the image does not contain image data of the at least one passive target, determining that a train is located on the railway track.

13. A method for detecting a train on a railway track as claimed in claim 12, wherein the method further comprises determining whether the received image data include image information about at least two passive targets spaced apart from each other, each passive target possessing at least one individual property recognisable by the cameras or by a controller treating the images captured by the cameras, a first camera of the at least two cameras and a first passive target being arranged on a first side of a road intersecting the railway track, and a second camera of the at least two cameras and a second passive target being arranged on a second side of the road.

14. A method for detecting a train on a railway track as claimed in claim 12, wherein the method further comprises emitting a second light illuminating at least one passive target with varying intensity over time from the second lateral side of the track, wherein each light emitting a unique signal different to that from each other light.

15. A controller for a train detection system for detecting a train on a railway track, the railway track defining a first lateral side and a second lateral side opposite the first lateral side, the controller being adapted:

to receive image data from at least two cameras, said cameras being arranged along the railway track spaced apart from each other, each camera being placed on either the first lateral side or the second lateral side, said cameras being arranged such that at least one passive target, placed respectively on the opposite lateral side of the railway track with respect to at least one of the cameras, is within the field of view of the at least one of the cameras, at least one light emitting a first light directed towards at least one of the cameras and/or the at least one passive target with varying intensity over time;

to detect light intensity variations over the time from the at least one light in order to determine that one of the cameras captures live images; and to determine whether the received image data include image information about the at least one passive target, and, in case the image does not contain image data of the at least one passive target, to determine that a train is located on the railway track.

16. A controller for a train detection system for detecting a train on a railway track as claimed in claim 15, wherein the controller is adapted to determine whether the received image data include image information about at least two passive targets as to determine whether a train is located on the railway track, said passive targets being arranged such that said at least two passive targets are spaced apart from each other, each passive target possesses at least one individual property recognisable to the cameras, a first camera of the at least two cameras and a first passive target is arranged on a first side of a road intersecting the railway track, and a second camera of the at least two cameras and a second passive target is arranged on a second side of the road.

17. A controller for a train detection system for detecting a train on a railway track as claimed in claim 15, wherein the controller is adapted to distinguish each light from other lights by a unique signal emitted by each light which is different to that of each other lights.

* * * * *